United States Patent [19]

McNair

[11] 3,739,872

[45] June 19, 1973

[54] GAS TURBINE EXHAUST SYSTEM

[75] Inventor: Robert E. McNair, Swarthmore, Pa.

[73] Assignee: Westinghouse Electric Corporation, Pittsburgh, Pa.

[22] Filed: May 27, 1971

[21] Appl. No.: 147,527

[52] U.S. Cl. ............ 181/33 HB, 60/39.5, 415/119, 181/56

[51] Int. Cl. ............ B64d 33/06

[58] Field of Search ........... 181/56, 33 HB, 33 HC; 60/39.5; 415/119

[56] References Cited

UNITED STATES PATENTS

| | | | |
|---|---|---|---|
| 2,685,936 | 8/1954 | Brenneman et al. | 181/33 HB |
| 3,187,835 | 6/1965 | Smith | 181/33 HC |
| 3,177,972 | 4/1965 | Wirt | 181/56 |
| 2,270,825 | 1/1942 | Parkinson et al. | 181/56 |
| 3,185,252 | 5/1965 | Lemmerman | 181/56 |
| 3,011,584 | 12/1961 | Lemmerman et al. | 181/33 HC |

*Primary Examiner*—Al Lawrence Smith
*Assistant Examiner*—Warren Olsen
*Attorney*—A. T. Stratton, F. P. Lyle and B. L. Samlan

[57] ABSTRACT

An efficient exhaust system in which the fluid from a turbine is discharged into a diffusing portion. The discharged fluid then flows into an elongated transition portion and is directed at the downstream end thereof into a silencer portion by a plurality of staggered turning vanes. The discharged fluid is turned at constant velocity, and a constant area is maintained between the flow path in the transition portion and the flow path in the silencer portion. There is an additional diffuser at the downstream end of the silencer portion.

5 Claims, 4 Drawing Figures

PATENTED JUN 19 1973

3,739,872

INVENTOR
Robert E. McNair

Bruce L. Samlan
ATTORNEY

GAS TURBINE EXHAUST SYSTEM

BACKGROUND OF THE INVENTION

The following disclosure relates to an exhaust system of a gas turbine. The major objectives of most large turbine exhaust systems are to convert the high velocity kinetic energy of the fluid leaving the turbine exhaust to the potential energy of pressure, minimize the pressure losses through the exhaust system, and reduces acoustic pollution to acceptable levels.

In open cycle gas turbine plants, it is common to have a diffuser portion to reduce the kinetic energy or the velocity of the turbine fluid discharge and to expand the area of the flow path and convert the energy to an increase in potential energy or pressure in the fluid. The greater the pressure recovery before the fluid is exhausted to atmosphere, the lower the fluid pressure is after the last turbine stage. The lower the pressure from the last turbine stage, the greater the pressure ratio across the turbine and the greater the work from the turbine. For every 3 units of work produced by the turbine, about 2 units drive the compressor and only about 1 unit of work is available for net output power to drive, for example, an electrical generator. Therefore, for every 1 percent increase in output power by the turbine without increasing the compressor requirements, results in a 3 percent increase in net output of the power plant. It is desirable then, to discharge the fluid from the turbine at as low a pressure as possible, to thereby maximize the power output and efficiency of the turbine power plant.

Previously, in small gas turbine power plants, the fluid was discharged at pressures below the ambient pressure, and then the fluid was passed through a diffuser to convert the kinetic energy or velocity of the fluid into pressure or potential energy. The pressure had to be at least equal to the ambient pressure so that the fluid could be ejected into the atmosphere. As turbine units become larger and acoustic pollution became a more serious problem, silencers were installed as part of the exhaust system to attenuate the noise to acceptable levels. Substantial pressure losses result in present exhaust systems. The pressure ratios and the efficiencies have substantially decreased using conventional diffuser and silencer combinations. Presently, pressure recoveries are about 35 percent of the maximum possible recoveries when comparing the fluid pressure at the turbine discharge to the fluid pressure of the fluid ejected from the exhaust system to the atmosphere.

A typical industrial gas turbine power plant has a diffusing area immediately adjacent the turbine exhaust, effectuating a pressure rise in the exhaust gases. The area of the flow path downstream of the diffuser substantially increases, and the fluid is turned into the silencer portion. The increase of area of flow decreases the velocity and causes an increase in pressure and the fluid is almost immediately turned into the silencer. The net result is segregation of the fluid into slow and fast moving streams with consequent high pressure losses in the remainder of the system. Prior art arrangements of this general type are shown in U.S. Pat. Nos. 2,626,101 and 3,453,443.

Dissipative silencers are used on gas turbines, rather than the reactive type, for their good attenuation of high frequency noise, their reasonable cost, and their moderate pressure loss.

Any separation or segregation of high velocity flow creates undesirable effects in the acoustical attenuator since the noise generation in a gas stream increases as the eighth power of the gas velocity. Uneven velocity distribution means a higher velocity and more noise generated in the exhaust system, which was intended to silence the air stream. Furthermore, the pressure losses go up with the square of the peak velocity and again uneven flow distribution greatly increases losses in the exhaust system whose second major purpose is the recovery of exhaust pressure.

Finally, dissipative silencers are made with relatively soft acoustical absorbing materials. Any uneven velocity distributions can lead to high velocity peaks in the silencer which are highly destructive to the silencer material.

What is desired then, is to design an improved exhaust system, which effectively converts the velocity of the discharge fluid into pressure and minimizes pressure losses through the silencer. It is further desirable to improve silencer operation, to minimize any further generation of noise in the exhaust and silencing system, and to increase the life of the silencer.

SUMMARY OF THE INVENTION

The following disclosure relates to a highly efficient exhaust system for a gas turbine.

In accordance with the present invention, there is provided in combination, a diffusing element exiting into a transition portion having an additional pressure recovery and an efficient mixing characteristic, a turning vane directing the exhaust fluid at a constant velocity directly into the silencing elements and maintaining a constant area between the transition portion and silencing portion, and an additional diffuser at the downstream tips of the silencing elements, enabling the turbine exhaust system to provide a substantially greater pressure recovery than is presently achieved. Because of the relatively uniform velocity flow, there is a more effective acoustic attenuation and an increase in the life of the silencer.

The exhaust system includes a diffuser portion which decreases the velocity of the fluid discharged from the turbine and increases the pressure of the fluid. From the diffuser portion the discharged fluid enters into a large volume transition portion in which the velocity of the fluid decreases and the pressure increases. As the fluid flows further downstream in the transition portion, the high and low velocity streams mix, and the velocity distribution becomes more uniform, resulting in a further decrease in average velocity and a corresponding pressure increase.

A plurality of turning vanes are staggered along a plane which is inclined relative to a plane transverse to the flow path of the fluid. The turning vanes direct the fluid from the transition portion into a silencer portion at substantially constant velocity. The silencer includes a plurality of equally spaced silencer elements. The upstream portions of the silencer elements are disposed adjacent to the exit portions of the turning vanes. The elements of the silencer are spaced so that the sum of the cross-sectional areas of the flow paths defined by the silencer elements in a plane transverse transverse to the flow path, is equal to the area in a plane transverse to the flow path in the transition portion. The air is directed from the transition portion at a relatively constant velocity and at a relatively constant area.

The downstream ends of the silencer elements are staggered so that the flow paths are of constant length. Tee downstream ends taper inwardly, thereby further increasing the area at the exit portion of the silencer and defining an additional diffuser. This provides a further pressure recovery.

DESCRIPTION OF THE PREFERRED EMBODIMENTS

Figure 1:
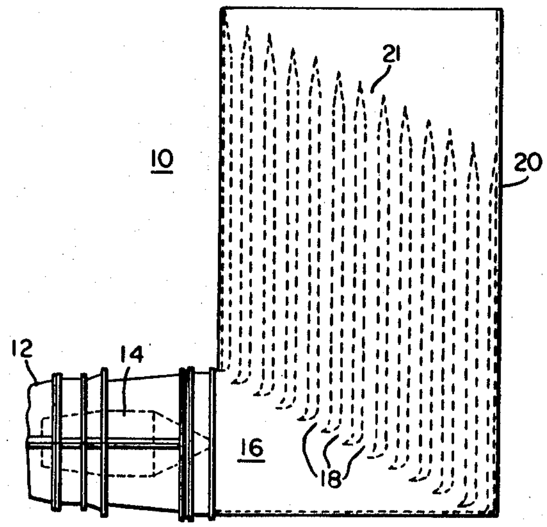
FIG. 1 is a longitudinal view showing an exhaust system of an axial flow turbine incorporating the invention therein.

Referring to the drawings in detail and more specifically to FIG. 1, there is shown an exhaust system 10 of a prime mover which exhausts high velocity fluid to atmosphere. The prime mover can be an axial flow elastic fluid utilizing machine, such as a gas turbine 12. The exhaust system 10 comprises a diffuser or conduit portion 14, a transition portion 16, a turning portion 18, a silencer or duct portion 20 and a final diffusing portion 21.

Figure 3:
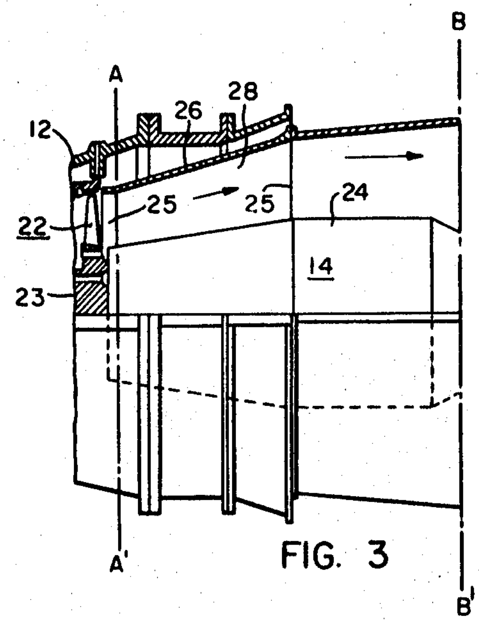
FIG. 3 is an enlarged sectional view, which is partly in elevation, of the diffuser portion of the exhaust system shown in FIG. 1.

Referring to FIG. 3, it can be seen that the last stage 22 of a turbine rotor structure 23 is in fluid communication with the diffuser portion 14. The diffuser portion 14 includes a diffusing member 24 which is concentrically disposed within the diffuser portion 14 and is disposed adjacent the rotor structure 23. The diffusing member 24 is supported by any suitable means such as struts 25. The diffuser member 24 may be of any suitable shape, but as shown is of circular cross section. The diffusing member 24 and a generally conical wall member 26 define a diverging fluid passageway 28. The passageway 28 is of generally increasing area between the inlet defined by transverse plane AA′ of the diffuser portion 14, and the outlet defined by transverse plane BB′ thereof.

Figure 4:
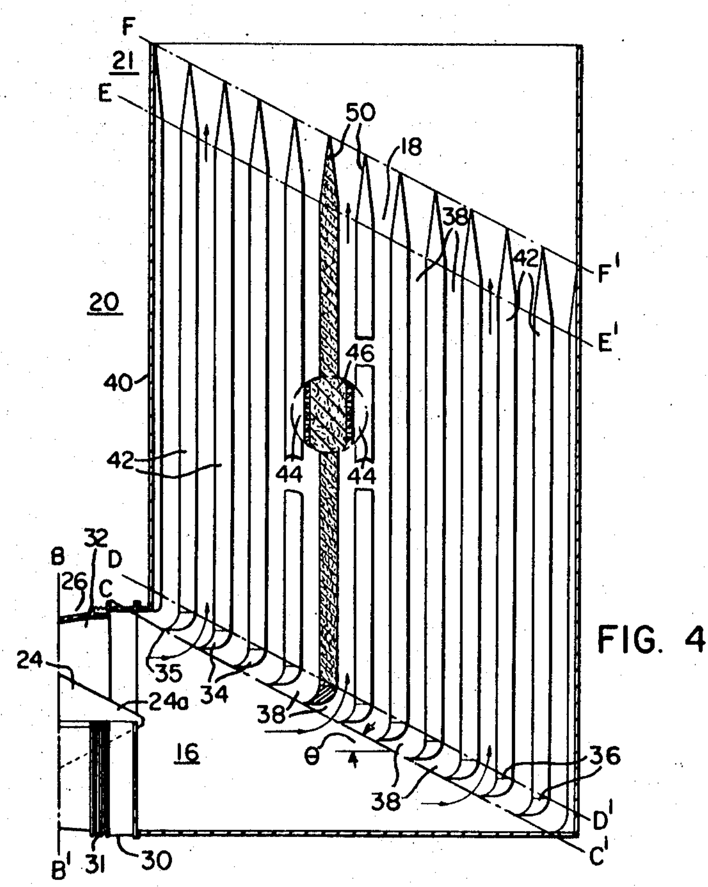
FIG. 4 is an enlarged sectional view of the mixing and silencer portions of the exhaust system shown in FIG. 1.

The diffuser portion 14 is in fluid communication with the transition portion 16, as best seen in FIG. 4. The transition portion 16 is defined by plane BB′, and by the upstream portion defined by plane CC′ of the turning portion 18. Wall member 26 is joined to a wall member 30 which is rectangular in cross section by an expansion joint 31. The downstream portion 24a of the diffusing member 24 extends into the transition portion 16 and is conically shaped. The fluid flow passageway 32 in the transition portion thereby abruptly and substantially increases in area from left to right to encourage turbulent mixing. The downstream portion of the transition portion 16 is bounded by inclined plane CC′ which is at an acute angle $\theta$ relative to a horizontal plane parallel to the flow path of the fluid. Therefore, the flow path in the transition portion, which is substantially triangular in a cross sectional view, is of increasing axial length from the top to the bottom of the passageway 32.

The turning portion 18 is in fluid communication with the transition portion 16. The turning portion 18 includes a plurality of turning vanes 34. Each turning vane 34 has a leading edge 35 and a trailing edge 36. The turning vane 34, in longitudinal profile, increases in width from the leading edge 35 to the trailing edge 36. The leading edges 35 of the turning vane 34 define the plane CC′. The cross sectional area of the turning portion 18 in a horizontal plane transverse to the fluid flow is approximately double the cross sectional area in the transition portion 16 taken immediately downstream of diffuser 24. The vanes 34 occupy approximately one-half of the cross sectional area in the turning portion 18, leaving the remaining half for flow passages. The turning vanes 34 are equally spaced from each other in a staggered relationship and define a plurality of passageways 38 which are substantially equal in cross sectional areas. The trailing edges 36 of the turning vanes 34 also define a plane DD′, inclined to the fluid flow, which is parallel to plane CC′. The sum of the cross sectional areas of flow paths 38 taken in a horizontal direction at the trailing edges 36 is substantially equal to the cross sectional area in a plane transverse to the flow path of the fluid in the transition portion immediately downstream of the diffusing member 24.

Figure 2:
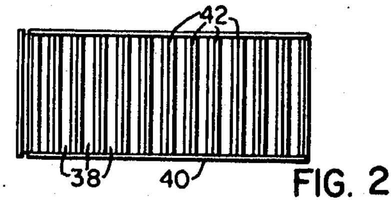
FIG. 2 is a plan view of the exhaust section shown in FIG. 1.

The silencer portion 20 is comprised of an exhaust hood or silencing duct 40 being of generally oblique parallelopiped shape as seen in FIGS. 2 and 4. Disposed within the silencing duct 40 are a plurality of vertically extending silencing elements or splitters 42. The splitters are equally spaced from each other and at their upstream ends are securely fastened to the trailing edges 36 of the vanes 34. The flow paths 38 in the turning portion 18 are continued vertically upward and are defined by the splitters 42. There are an equal number of turning vanes 34 and corresponding splitters 42 to cooperatively define a plurality of flow paths 38 from the transition portion 16 through the silencer portion 20. Therefore, as in the turning portion 18, the sum of the cross sectional areas of the flow paths 38 in the silencing duct in a plane transverse to the direction of flow of the fluid, is substantially equal to the cross sectional area of the flow path in the transition portion 16 in a plane transverse to the direction of flow immediately adjacent the diffusing member 24.

As shown in the blown-up cross sectional portion of the silencing element 40 in FIG. 4, the splitter is comprised of a foraminous or porous wall member 44 on opposite sides of the splitter which may be of any suitable material to withstand the forces of the high velocity air. Disposed within the foraminous wall member 44 is a relatively soft, absorptive type of silencing material which is commonly used in silencers of the dissipative type. As shown, the turning vanes 34 are comprised of a metallic material strong enough to withstand the forces of the moving fluid to turn the fluid. The wall members 44 are securely fastened to the turning vane 34 to form a single piece and to thereby prevent leakage between adjacent flow paths 38. In certain situations, however, where the fluid forces are not too great, the vanes 34 may be made of a foraminous wall member with dissipative silencing material disposed therein.

The silencing elements or splitters 40 are of equal longitudinal length, and the flow paths 38 defined therebetween, are also of equal length. The downstream ends of the splitters 40 are arranged in staggered relation and thereby define a plane EE′ which is inclined relative to the fluid flow and is parallel to planes CC' and DD'.

Adjacent the downstream end EE' of the splitters 40 is the final diffusing portion 21. The diffusing portion 21 includes tapered segments 50 which, as shown, are integral with and form the end portions of splitters 40. The segments 50 taper inwardly to a point to thereby increase the cross sectional area of the flow paths 38, as the flow paths end at the tips of the segments. The final flow path is, in the illustration given, approximately doubled from the sum of the individual flow paths 38 in the silencer portion 20. The tips of the segments 50 define another inclined plane FF', which is parallel to plane EE', and which is inclined to a plane transverse to the flow of fluid passing through the silencing duct 40.

THEORY OF OPERATION

Hot elastic fluid is discharged from the last stage 22 of the gas turbine 12 and flows into the diffuser portion 14 in diverging passageway 28. The kinetic energy or the velocity of the turbine fluid discharge is converted to an increase in potential energy or pressure of the fluid. The fluid leaves the portion 14 and enters the transition portion 16 through diverging passageway 32.

The fluid emerges from the diffusing portion 14 with a relatively low velocity along the walls and a relatively high velocity in the center. Further attempts to diffuse in the conventional diffuser with gradually increasing area would result in separation and no further pressure gain whatever. According to this invention, however, the fluid is dumped into the transition section 16 for turbulent mixing and evening of the velocity profile. There is an abrupt jump in area to deliberately cause turbulence of the fluid. The turbulence causes mixing of the fluid and creates a more uniform velocity profile downstream in the transition member 16. It can be shown from the continuity equation that after the velocity equalizes in the downstream portion of the larger transition section 16 that the average velocity is lower than the average velocity at the entrance to the transition section. It can also be seen from the momentum equation that there is an increase in pressure as the average velocity decreases in this transition section. Therefore, in the transition section, the high and low velocity fluid streams mix and a more even velocity distribution is achieved with a further increase in pressure.

The fluid then contacts the leading edges 35 of the turning vanes 34, the fluid at the upper portions of passageway 32 coming in contact with the vanes before the fluid on the bottom portions of the passageway. The turning vanes 34 are in spaced relation relative to each other, and as previously described, the sum of the cross sectional areas of the passageways 38, in a plane transverse to the fluid flow, is equal to the cross sectional area of the transition portion 16 downstream of the diffusing member 24 in a plane transverse to the fluid flow. Therefore, the fluid passing through the turning portion 18 is turned at a relatively constant area and at a relatively constant velocity. Since the velocity distribution in the transition portion 16 becomes relatively uniform because of the mixing characteristics therein, and because the velocity tends to remain constant through the turning portion 18, a highly efficient turn of the fluid is accomplished with minimal losses in pressure and fluid separation. Much better use of the dissipative type of silencer splitters 40 are achieved because of the decrease in average velocity of the fluid and because the destructive high velocity streams in the center of the flow path are also substantially decreased. When the high velocity streams are substantially reduced, the attenuation ability of the silencer is increased, and there is substantially less wear and tear on the silencing elements.

The fluid flows through the parallel paths 38 which are of equal length. The silencer portion 20, because it maintains constant area, may actually serve as a continuation of the mixing action occurring in the transition portion 16. The splitters 40 are all of the same length, and the flow passages 38 are also of the same length. The purpose of equal length flow passages 38 is to provide a uniform flow resistance throughout all of the flow paths 38. In this manner a uniform fluid flow rate is maintained throughout all the paths.

The fluid flows from the silencing portion 20 into the final diffusing portion 21 and the area of the flow path approximately doubles. This provides a further pressure recovery of the fluid.

As previously mentioned, present maximum pressure recoveries in the exhaust systems on large industrial gas turbines are about 35 percent when comparing the fluid pressure at the turbine discharge to the fluid pressure of the fluid ejected from the exhaust system to the atmosphere. Recent tests have indicated that large industrial gas turbines using the exhaust system described herein, have a pressure recovery of 75 percent. This means that the pressure recovered has increased by approximately 40 percent or has more than doubled when compared to the prior art. The more pressure recovered, the more turbine work can be performed. As an example, a large industrial gas turbine power plant having a 60 megawatt rating recovers approximately 4,000 kilowatts of power using the new exhaust system. This added power is achieved with no increase in fuel, so the overall turbine efficiency is also improved. At a present commercial value of approximately $40.00 per kilowatt, the 4,000 more kilowatts is worth approximately 160,000.00 per gas turbine unit. As an added benefit, the noise pollution is more effectively attenuated and because of the smoother velocity distribution, the life of the silencer is substantially increased.

What is disclosed then is a highly effective exhaust system which has a diffusing portion, a transition portion recovering additional pressure and having an effective mixing characteristic, a fluid directing portion which turns the fluid at a constant velocity into a silencing portion at constant area, and an additional diffuser portion at the downstream end of the silencing portion. The system provides a substantially greater pressure recovery than is presently achieved and there is a more effective acoustic attenuation with an increase in silencer life.

What is claimed is:

1. An exhaust system which converts high velocity of an exhaust fluid into pressure head and attenuates the noise associated therewith, said exhaust system comprising an exhaust conduit and an exhaust duct through which the high velocity exhaust fluid flows, said duct being disposed downstream of said conduit, said duct being disposed on an angle with respect to said conduit, and a plurality of generally parallel vanes disposed within said duct, each vane having an arcuate shaped leading edge portion which increases in cross sectional area in downstream direction and is adapted to change the direction of the fluid, an elongated generally straight portion of generally constant cross sectional area, which extends through the major portion of said duct, said straight portion being formed of spaced apart perforated sheet material and the space therebetween being filled with a sound absorbent material, and a trailing edge of decreasing cross-sectional area in downstream direction, whereby said exhaust fluid is exhausted at a high efficiency and low noise level.

2. An exhaust system as set forth in claim 1, wherein said duct has a rectangular cross section and the vanes extend between opposite parallel walls thereof.

3. An exhaust system as set forth in claim 1, wherein the major portion of the flow path through the vanes has a constant cross section.

4. An exhaust system as set forth in claim 3, wherein a short portion of the flow path adjacent the leading edge portion of the vanes is converging and a short portion of the flow path adjacent the trailing edge portion of the vanes is diverging.

5. An exhaust system as set forth in claim 1, wherein the duct is generally disposed at an angle of approximately 90° with respect to the conduit.

* * * * *